US011619244B2

(12) United States Patent
Blackwell et al.

(10) Patent No.: US 11,619,244 B2
(45) Date of Patent: Apr. 4, 2023

(54) FLUIDIC CONTROL SYSTEM

(71) Applicant: LIBERTY VEHICLE TECHNOLOGIES LIMITED, London (GB)

(72) Inventors: Anthony Blackwell, London (GB); Marc Amblard, London (GB)

(73) Assignee: LIBERTY VEHICLE TECHNOLOGIES LIMITED, London (GB)

( * ) Notice: Subject to any disclaimer, the term of this patent is extended or adjusted under 35 U.S.C. 154(b) by 517 days.

(21) Appl. No.: 16/620,662

(22) PCT Filed: Jun. 7, 2018

(86) PCT No.: PCT/GB2018/051553
§ 371 (c)(1),
(2) Date: Dec. 9, 2019

(87) PCT Pub. No.: WO2018/224834
PCT Pub. Date: Dec. 13, 2018

(65) Prior Publication Data
US 2020/0182262 A1 Jun. 11, 2020

(30) Foreign Application Priority Data

Jun. 9, 2017 (GB) ..................................... 1709239
Jun. 9, 2017 (GB) ..................................... 1709241
(Continued)

(51) Int. Cl.
*B60T 11/30* (2006.01)
*F15B 1/027* (2006.01)
(Continued)

(52) U.S. Cl.
CPC ................ *F15B 1/027* (2013.01); *B60T 7/12* (2013.01); *B60T 8/17* (2013.01); *B60T 13/147* (2013.01);
(Continued)

(58) Field of Classification Search
CPC . B60T 7/12; B60T 8/17; B60T 13/141; B60T 13/147; B60T 13/161;
(Continued)

(56) References Cited

U.S. PATENT DOCUMENTS 4,106,818 A 8/1978 Fiala
4,441,357 A 4/1984 Kahn et al.
(Continued)

FOREIGN PATENT DOCUMENTS

CN 1435351 A 8/2003
CN 101929490 A 12/2010
(Continued)

OTHER PUBLICATIONS

China National Intellectual Property Administration, Notice of the First Examination Opinion, Application 201880050822.7, dated Jul. 1, 2021.
(Continued)

*Primary Examiner* — Nicholas J Lane
(74) *Attorney, Agent, or Firm* — Robert L. Stearns; Dickinson Wright, PLLC

(57) ABSTRACT

A fluidic control system (1) for controlling a vehicle, which includes a controller (2) and a closed fluidic circuit. The circuit includes a pump (3) for pressurizing fluid in the circuit, valve means (40, 50, 60), an actuator (4, 5, 6) and a precharge accumulator (7). The valve means (40, 50, 60) is fluidly connected to the inlet and outlet of the pump (3) and the actuator (4, 6) is fluidly connected to the valve means (40, 50, 60) for selectively receiving pressurized fluid there-
(Continued)

from. The precharge accumulator (7) includes a movable member (73, FIG. 2) that describes a variable volume (71) fluidly connected to the circuit between the valve means (40, 50, 60) and the inlet of the pump (3). The system (1) also includes a sensor (70) for determining the position of the movable member (73) for estimating the quantity of fluid and/or detecting an abnormal pressure variation within the circuit.

18 Claims, 3 Drawing Sheets

(30) Foreign Application Priority Data

| Jun. 9, 2017 | (GB) | ................................ | 1709242 |
|---|---|---|---|
| Jun. 9, 2017 | (GB) | ................................ | 1709243 |
| Jun. 9, 2017 | (GB) | ................................ | 1709246 |

(51) Int. Cl.

| B60T 7/12 | (2006.01) |
|---|---|
| B60T 8/17 | (2006.01) |
| B60T 13/14 | (2006.01) |
| B60T 13/16 | (2006.01) |
| B60T 13/20 | (2006.01) |
| B60T 13/58 | (2006.01) |
| B60T 13/68 | (2006.01) |
| B60T 17/22 | (2006.01) |
| F15B 13/04 | (2006.01) |
| F15B 19/00 | (2006.01) |
| F15B 21/08 | (2006.01) |
| B62D 5/07 | (2006.01) |
| F16D 48/02 | (2006.01) |

(52) U.S. Cl.
CPC ............ *B60T 13/167* (2013.01); *B60T 13/20* (2013.01); *B60T 13/58* (2013.01); *B60T 13/686* (2013.01); *B60T 17/221* (2013.01); *F15B 13/04* (2013.01); *F15B 19/00* (2013.01); *F15B 21/08* (2013.01); *B60T 2260/02* (2013.01); *B60T 2260/06* (2013.01); *B60T 2260/08* (2013.01); *B60T 2270/402* (2013.01); *B60T 2270/82* (2013.01); *B62D 5/07* (2013.01); *F15B 2201/51* (2013.01); *F15B 2211/50* (2013.01); *F16D 48/02* (2013.01); *F16D 2048/0203* (2013.01); *F16D 2048/0221* (2013.01)

(58) Field of Classification Search
CPC ............... B60T 2260/08; B60T 17/221; B60T 2270/82; F15B 1/027; F15B 21/08; F15B 13/04; F15B 19/00; F15B 2201/51; F15B 2211/50; B62D 5/07
See application file for complete search history.

(56) References Cited

U.S. PATENT DOCUMENTS

| 4,449,733 | A | | 5/1984 | Iida et al. | |
|---|---|---|---|---|---|
| 5,338,107 | A | | 8/1994 | Rossigno et al. | |
| 5,836,347 | A | * | 11/1998 | Harries | B62D 5/07 |
| | | | | | 137/488 |
| 6,206,484 | B1 | * | 3/2001 | Ganzel | H03K 5/08 |
| | | | | | 303/119.2 |
| 6,312,062 | B1 | | 11/2001 | Hashida | |
| 6,652,039 | B1 | * | 11/2003 | Shull | B60T 8/404 |
| | | | | | 303/113.5 |
| 7,617,906 | B2 | | 11/2009 | Williams | |
| 9,308,905 | B2 | | 4/2016 | Biller et al. | |
| 2001/0048245 | A1 | * | 12/2001 | Trzmiel | B60W 30/18 |
| | | | | | 303/119.1 |
| 2002/0021044 | A1 | | 2/2002 | Hara et al. | |
| 2002/0035832 | A1 | * | 3/2002 | Nakamura | F15B 19/00 |
| | | | | | 60/413 |
| 2003/0146658 | A1 | | 8/2003 | Yang | |
| 2005/0110337 | A1 | * | 5/2005 | Zheng | B60T 8/4072 |
| | | | | | 303/10 |
| 2006/0008356 | A1 | | 1/2006 | Smith et al. | |
| 2007/0018497 | A1 | | 1/2007 | Nomura et al. | |
| 2007/0188019 | A1 | | 8/2007 | Maki et al. | |
| 2098/0190720 | | | 8/2008 | Bareiss | |
| 2009/0001807 | A1 | | 1/2009 | Nomura et al. | |
| 2010/0029440 | A1 | | 2/2010 | Burns et al. | |
| 2010/0319336 | A1 | | 12/2010 | Egedal et al. | |
| 2011/0107863 | A1 | * | 5/2011 | Ren | B60K 6/48 |
| | | | | | 74/473.11 |
| 2013/0221733 | A1 | | 8/2013 | Matsuoka | |
| 2015/0035353 | A1 | | 2/2015 | Drumm | |
| 2018/0005462 | A1 | * | 1/2018 | Milton | G07C 5/006 |
| 2018/0257630 | A1 | * | 9/2018 | Kapanowski | B60T 13/662 |

FOREIGN PATENT DOCUMENTS

| CN | 103287413 A | 9/2013 |
|---|---|---|
| CN | 104863909 A | 8/2015 |
| DE | 19939437 A1 | 10/2000 |
| DE | 10159326 A1 | 7/2003 |
| DE | 102013221486 A1 | 4/2015 |
| EP | 0103624 B1 | 9/1988 |
| EP | 1106462 A2 | 6/2001 |
| EP | 1177960 A2 | 2/2002 |
| EP | 1334894 A2 | 8/2003 |
| EP | 1614904 A2 | 1/2006 |
| EP | 2008896 A1 | 12/2008 |
| EP | 2098425 A1 | 9/2009 |
| EP | 2151361 A2 | 2/2010 |
| EP | 2329982 A1 | 6/2011 |
| GB | 2396340 A | 6/2004 |
| GB | 2403520 A | 1/2005 |
| JP | H11117914 A | 4/1999 |
| JP | H11303809 A | 11/1999 |
| JP | 2003226232 A | 8/2003 |
| JP | 2007030665 A | 2/2007 |
| JP | 2013173459 A | 9/2013 |
| JP | 2017087798 A | 5/2017 |
| WO | 2014194907 A2 | 12/2014 |
| WO | 2015064044 A1 | 5/2015 |
| WO | 2016169968 A1 | 10/2016 |

OTHER PUBLICATIONS

United Kingdom Search Report dated Nov. 13, 2017 (GB1709239.6).
United Kingdom Search Report dated Nov. 28, 2017 (GB1709246.1).
United Kingdom Search Report dated Nov. 22, 2017 (GB1709242.0).
United Kingdom Search Report dated Nov. 24, 2017 (GB1709243.8).
International Search Report dated Aug. 20, 2018 (PCT/GB2018/051553).

* cited by examiner

FLUIDIC CONTROL SYSTEM

BACKGROUND

1. Technical Field

This invention relates generally to a fluidic control system for controlling the operation of one or more features. More specifically, although not exclusively, this invention relates to a hydraulic control system useful for controlling the operation of vehicle control systems, such as steering, braking, clutch and/or auxiliary control systems.

2. Related Art

Conventional hydraulic power steering systems generally include a steering gear having a hydraulic motor supplied by a fluid pump that draws hydraulic fluid from a fluid reservoir and is typically powered by the engine or gearbox of the vehicle. The steering gear has a rotary control valve that directs hydraulic fluid to the hydraulic motor in response to steering inputs generated by turning of the steering wheel. The hydraulic motor is operatively connected to the wheels of the vehicle to supplement a steering input.

U.S. Pat. No. 7,617,906 describes a steering system having a torque sensor for detecting steering inputs and a controller which controls a hydraulic steering motor in response to the sensed steering inputs. The hydraulic steering motor is actuated by a hydraulic pump that is driven by a dedicated electric motor for steering the wheels.

Conventional hydraulic braking systems generally include a master cylinder coupled to a brake pedal to convert mechanical actuation of the pedal into a hydraulic pressure. The master cylinder is connected to a hydraulic braking circuit which feed slave cylinders incorporated into brake actuators, such as brake calipers. These slave cylinders are operated by the hydraulic pressure supplied by the master cylinder to actuate brake pads in order to slow the vehicle.

U.S. Pat. No. 9,308,905 describes a braking system having a master cylinder coupled to a brake pedal, a pressure sensor for detecting a pressure in the master cylinder and a boost module to enable brake-by-wire functionality. The boost module includes pumps driven by an electric motor which supplement the hydraulic pressure provided to the brake actuators.

SUMMARY

Vehicle electrification has become central to the research and development strategies of many automotive companies. The Applicant has observed that this drive for electrification of vehicle powertrains has also result in a trend toward electrification of operational control systems. Whilst electrification facilitates the integration of such systems, thereby enabling redundant components to be eliminated, complete electrification can result in compromises.

Accordingly, a first aspect of the invention provides a fluidic control system, e.g. for a vehicle, comprising a closed fluidic circuit, the circuit comprising a pump having an inlet and an outlet for pressurizing fluid in the circuit, valve means operatively connected to the inlet and outlet of the pump, an actuator fluidly connected to the valve means for selectively receiving pressurized fluid therefrom and a precharge accumulator fluidly connected between the valve means and the inlet of the pump, wherein the precharge accumulator comprises a movable member describing a variable volume fluidly connected to the valve means and the inlet of the pump and a sensor for determining the position of the movable member.

By determining the position of the movable member of the precharge accumulator, the system is able to estimate the quantity of fluid within the circuit and/or detect an abnormal pressure variation within the circuit. This enables the system to be configured to detect automatically faults and/or leaks within the circuit. The actuator may comprise a brake actuator or a non-brake actuator. The system may comprise a controller, which may be operatively connected to the valve means, e.g. wherein the controller is configured to operate, in use, the valve means for controlling the supply of pressurized fluid to the actuator.

The biasing means may be for biasing or acting, for example may bias or act, in use, on the movable member or variable volume, e.g. to generate a pressure therein and/or for maintaining the or a predetermined fluid pressure within the circuit or at or to the pump inlet.

The biasing means may comprise a biaser. The biasing means or biaser may comprise a biasing member or mechanism, for example a resilient biasing member or mechanism, such as a spring, or other suitable biasing means. Preferably, the biasing means comprises a precharge chamber, which may contain a second pressurized fluid, e.g. a compressible fluid such as air or another gas, therein.

The system or precharge accumulator may comprise a pressure sensor, e.g. for sensing the pressure within the precharge chamber and/or for determining the position of the movable member and/or for estimating the pressure at the inlet of the pump. The precharge accumulator pressure sensor may be operatively or fluidly coupled to the precharge chamber. The precharge accumulator pressure sensor may comprise the aforementioned sensor for determining the position of the piston. Alternatively, the system or precharge accumulator may comprise a position sensor for determining the position of the piston. In embodiments, the system or precharge accumulator comprises a pressure sensor and a position sensor.

The variable volume may be fluidly connected to the inlet and outlet of the precharge accumulator. The variable volume may comprise a charging chamber. The precharge accumulator inlet may comprise an inlet of the charging chamber and/or the precharge accumulator outlet may comprise an outlet of the charging chamber. The precharge accumulator may comprise the shutoff means and/or the bleed inlet port and/or the bleed outlet port. The movable member may have a bleed position in which the inlet and/or the outlet is blocked, e.g. in which the movable member blocks the inlet and/or the outlet. The movable member may comprise or provide the shutoff means, for example by virtue of the bleed position.

The movable member may comprise a flexible member, such as a bladder, or a movable piston, for example between the biasing means and the variable volume or charging chamber. The movable member may be for varying the volume of the charging chamber. The sensor may comprise a position sensor. The system or controller may be operable or configured to estimate the volume of fluid in the fluidic circuit based on a detected position of the movable member, e.g. a position detected by the sensor.

The system or controller may be operable or configured to determine, calculate and/or indicate an estimated volume of fluid in the fluidic circuit. The system or controller may be operable or configured to generate an alert or warning if the estimated volume deviates from a predetermined value or range. The system or controller may be operable or configured to compare an estimated volume of fluid in the fluidic circuit with a predetermined threshold value or range. The system or controller may be operable or configure to generate the or an alert or warning if the estimated volume exceeds or drops below or otherwise deviates from the predetermined threshold value or range.

Another aspect of the invention provides a fluidic control system for a vehicle, the system comprising a controller and a fluidic circuit, the circuit comprising a pump for pressurizing fluid in the circuit, a first or brake actuator fluidly connected to a first valve means and a second or non-brake actuator fluidly connected to a second valve means, wherein each valve means is operatively connected to the controller and the controller is configured to operate, in use, the first valve means for controlling the supply of pressurized fluid to the first or brake actuator, e.g. to slow or stop the vehicle, and to operate the second valve means for controlling the supply of pressurized fluid to the second or non-brake actuator, e.g. for the operation thereof.

The use of a common fluidic circuit for the operation of both the brakes and one or more other actuation systems makes use of the advantages of fluidic control systems whilst benefiting from the efficiencies derived from the aforementioned integration of multiple control systems.

Another, more general aspect of the invention provides a fluidic control system, e.g. for a vehicle, the system comprising a fluidic circuit including a pump for pressurizing fluid in the circuit, valve means and an actuator fluidly connected to the valve means, wherein the valve means is operable to control, in use, the supply of pressurized fluid to the actuator. The actuator may comprise a brake actuator or a non-brake actuator. The system may comprise a controller operatively connected to the valve means and/or configured to operate the valve means to control, in use, the supply of pressurized fluid to the actuator.

The system may comprise a third valve means and/or a third or further non-brake actuator. The third or further non-brake actuator may be fluidly connected to the third valve means. The third valve means may be operatively connected to the controller. The controller may be configured to operate, in use, the third valve means, e.g. for controlling the supply of pressurized fluid to the third or further non-brake actuator.

The system may comprise one or more additional valve means and/or one or more additional actuators, e.g. non-brake actuators. The or each additional actuator may be fluidly connected to the or a respective additional valve means. The or each additional valve means may be operatively connected to the controller. The controller may be configured to operate, in use, the or each additional valve means, e.g. for controlling the supply of pressurized fluid to the or each additional actuator.

The second or non-brake actuator may comprise a first actuator type. The third or further non-brake actuator and/or the or each additional actuator may comprise a second or subsequent actuator type, which may be different from the first actuator type and/or different from any other of the actuator types. The first and second and, if present, further actuator types may be selected from a list comprising, or consisting of, a steering actuator for steering the vehicle, a clutch actuator for engaging or disengaging a clutch of the vehicle, a gear shift actuator for changing a gear ratio of the vehicle, a torque vectoring actuator for varying the torque to one or more wheels of the vehicle, a suspension actuator for changing a suspension characteristic of the vehicle, an aerodynamic or aerofoil actuator for moving an aerodynamic element of the vehicle and an auxiliary actuator.

One of the actuators may comprise a steering actuator, e.g. for steering the vehicle. The steering actuator may comprise at least one steering arm, e.g. a pair of steering arms, for mechanical connection to, e.g. directly or indirectly to, a front wheel or a respective front wheel of a vehicle.

One of the actuators may comprise a clutch actuator, e.g. for engaging or disengaging a clutch of the vehicle. The clutch actuator may comprise connection means or connector, e.g. for mechanical connection to, for example directly or indirectly to, a clutch assembly or actuation system of a vehicle.

One of the actuators may comprise a gear shift actuator, e.g. for changing a gear ratio of the vehicle. The gear shift actuator may comprise connection means or connector, e.g. for mechanical connection to, for example directly or indirectly to, a gear shift actuation system of a vehicle.

One of the non-brake actuators may comprise a torque vectoring actuator, e.g. for varying the torque to one or more wheels of the vehicle. The torque vectoring actuator may comprise connection means or connector, e.g. for mechanical connection to, for example directly or indirectly to, a torque vectoring system of a vehicle.

One of the non-brake actuators may comprise a suspension actuator, e.g. for changing one or more suspension characteristics of the vehicle. The suspension actuator may comprise connection means or connector, e.g. for mechanical connection to, for example directly or indirectly to, a suspension system of a vehicle.

One of the non-brake actuators may comprise an aerodynamic or aerofoil actuator, e.g. for moving an aerodynamic element or aerofoil of the vehicle. The aerodynamic or aerofoil actuator may comprise connection means or connector, e.g. for mechanical connection to, for example directly or indirectly to, a dynamic aerofoil control system of a vehicle.

One of the non-brake actuators may comprise an auxiliary actuator. The auxiliary actuator may comprise connection means or connector, e.g. for mechanical connection to, for example directly or indirectly to, an auxiliary control system of a vehicle. The auxiliary control system may comprise a door actuator, e.g. an automated or assisted door actuator, a step actuator and/or an actuator for any other auxiliary actuation or control system.

The brake actuator may be one of a plurality of brake actuators. The or each brake actuator may be configured to be mounted to or adjacent to a wheel of a vehicle. The or each brake actuator may be fluidly connected to a respective first valve means. The controller may be configured to operate each first valve means to control, in use, the supply of pressurized fluid to the or each brake actuator, e.g. independently.

The provision of fluidic control of each brake actuator enables improved control over the braking performance of the vehicle, which can be particularly advantageous in an autonomous or semi-autonomous vehicle.

At least one or the or each brake actuator may comprise a friction brake actuator, e.g. for applying a friction force to slow or stop the vehicle. At least one or each brake actuator may comprise a brake caliper or cylinder, e.g. a disc brake caliper or cylinder thereof, or a drum brake cylinder. Preferably, one of the plurality of brake actuators is operatively connected or connectable to each of a plurality of wheels of a vehicle in which the system is incorporated or is to be incorporated. At least one or each of the brake actuators may be operatively connected or connectable to and operable to actuate a brake pad or shoe. At least one or each brake actuator may be operably connected or connectable to a wheel of a vehicle, for example via a brake member such as a disc or drum, for slowing the wheel or for applying a friction force thereto.

Additionally or alternatively, at least one of the actuators may be mechanically connected or connectable to, for example directly or indirectly to, a master cylinder of or for a further fluidic circuit of a vehicle. The controller may be configured to operate the valve means, e.g. the relevant valve means, in order to apply, in use, a mechanical force to the master cylinder.

Another aspect of the invention provides a fluidic control system, e.g. for a vehicle, the system comprising a controller and a fluidic circuit, the circuit comprising a pump for pressurizing fluid in the circuit and an actuator fluidly connected to valve means and mechanically connected or connectable to, or integral with, a master cylinder of or for a further fluidic circuit of a vehicle, wherein the valve means is operatively connected to the controller and the controller is configured to operate the valve means to control, in use, the supply of pressurized fluid to the actuator in order to apply a mechanical force to the master cylinder for operating the further fluidic circuit of the vehicle.

The provision of fluidic control for mechanically operating the master cylinder of another fluidic circuit facilitates the integration of autonomous or semi-autonomous functionality in existing vehicle braking system designs. The actuator may comprise a brake actuator or a non-brake actuator. The system may comprise a controller, which may be operatively connected to the valve means, e.g. wherein the controller is configured to operate, in use, the valve means for controlling the supply of pressurized fluid to the actuator.

At least one of the actuators may comprise connection means for mechanical connection to the master cylinder. In embodiments, the brake actuator comprises connection means for mechanical connection to, for example directly or indirectly to, a master cylinder of a brake circuit of a vehicle. In embodiments, the non-brake actuator comprises connection means for mechanical connection to, for example directly or indirectly to, a master cylinder of a clutch circuit of a vehicle.

The system may comprise a master cylinder mechanically connected to the actuator, e.g. via the connection means. The system may comprise a master cylinder incorporating the actuator. The master cylinder may be for fluid connection to a further fluidic circuit of the vehicle.

The system may comprise a further fluidic circuit. The or one of the actuator(s) may be mechanically connected or connectable to, or integral with, a master cylinder of the further fluidic circuit. The system may comprise a fluidic brake circuit. The or one of the actuator(s) may be mechanically connected or connectable to, or integral with, a master cylinder of the fluidic brake circuit. The system may comprise a fluidic clutch actuation circuit. The or one of the actuator(s) may be mechanically connected or connectable to, or integral with, a master cylinder of the fluidic clutch actuation circuit.

Any of the aforementioned connection means may comprise a connector, coupling or one or more connection or coupling features. The system may comprise the master cylinder. The system may comprise the fluidic circuit, or further fluidic circuit, of the vehicle, including the master cylinder.

The system may comprise a motor, which may be operatively connected or coupled to the pump, e.g. for operating the pump or causing it to pressurize fluid in the circuit. The motor may comprise a standalone or dedicated motor, for example independent of any other systems. The motor may, but need not, be independent of a vehicle powertrain, for example it may be uncoupled or decoupled from the powertrain. The motor may be powered independently of the engine or power plant of the vehicle, e.g. the powertrain, engine or power plant used for inducing motion to the vehicle. The motor may be electric. The motor may be operably connected to the controller and/or the controller may be configured to operate, in use, the motor, e.g. to pressurize fluid in the circuit.

In embodiments, the system comprises an electric motor independent of a vehicle powertrain, wherein the motor is coupled to the pump and operatively connected to the controller and the controller is configured to operate, in use, the motor to pressurize fluid in the circuit.

The motor may comprise a variable speed motor and/or the controller may be configured to control the speed of the motor, for example to control the flow and/or pressure in the fluidic circuit and/or provided by the pump.

Another aspect of the invention provides a fluidic control system, e.g. for a vehicle, the system comprising a controller, a variable speed motor operatively connected to the controller and a fluidic circuit, the circuit comprising a pump operatively connected or coupled to the motor for pressurizing fluid in the circuit, valve means operatively connected to the controller and an actuator fluidly connected to the valve means, wherein the controller is configured to control, in use, the speed of the motor and to operate the valve means in order to control the supply of pressurized fluid to the actuator.

This arrangement provides a simple, inexpensive and efficient means of generating pressure within the system on demand and independent of, for example, the operation of the powertrain of the vehicle. The actuator may comprise a brake actuator or a non-brake actuator.

The motor may, but need not, comprise a brushless electric motor, and/or the pump may, but need not, comprise a fixed displacement pump. In embodiments, the system comprises a brushless electric motor operatively connected or coupled to a fixed displacement pump for controlling the pressure supplied by the pump to the circuit. The motor may comprise a direct current (DC) or alternating current (AC) or universal (AC-DC) current motor, which may be brushed or brushless, or any suitable motor, whether electric or not. The pump may comprise any suitable pump, for example a fixed or variable displacement pump. The pump may comprise a piston pump, which may but need not have a swash plate.

The system may comprise a power source, such as one or more energy storage devices. The motor may be operatively or electrically connected to at least one of the energy storage devices. A powertrain motor may also be connected to at least one of the one or more energy storage devices. The motor and the powertrain may be connected to at least one common energy storage device or different energy storage devices. At least one of the energy storage devices may comprise a battery, for example a lithium-ion, solid-state, lead-acid, nickel metal hydride or molten chloroaluminate sodium battery. At least one of the energy storage devices may comprise a fuel cell.

The pump may comprise an inlet and/or an outlet. The fluidic circuit comprises one or more pressure sensors, e.g. for detecting or measuring pressure within the fluidic circuit, for example at one or more different points within the circuit. The fluidic circuit may comprise one or more pressure sensors downstream of the pump, e.g. fluidly connected to an outlet of the pump, and/or one or more pressure sensors upstream of the pump, e.g. fluidly connected to the inlet of the pump. At least one or each of the pressure sensors may be operatively connected to the controller.

In embodiments, the system comprises a pressure sensor downstream of the pump and operatively connected to the controller, the controller being configured to control, in use, the speed of the motor based on, e.g. in response to, a pressure detected by the pressure sensor.

The fluidic circuit may be closed or comprise a closed circuit, for example a pressurized closed circuit which may comprise or be configured to operate at a non-zero pressure, e.g. throughout the circuit. The circuit may comprise a high pressure portion, section or sub-circuit and/or a low pressure portion, section or sub-circuit. Each of the high pressure and low pressure portions, sections or sub-circuits may comprise or be configured to operate at a non-zero pressure.

The valve means may be fluidly connected to the inlet and/or the outlet of the pump. At least one or each valve means may comprise a high pressure inlet and/or a low pressure return outlet. The high pressure inlet of the or each valve means may be fluidly connected to the or an outlet of the pump. The low pressure return outlet of the or each valve means may be fluidly connected to the or an inlet of the pump, e.g. such that the fluidic circuit is closed.

In embodiments, at least one or each valve means comprises first and second ports, each of which may be connected or connectable to the actuator. The valve means may be operable to selectively connect the high pressure inlet and/or the low pressure return outlet to one of, e.g. a respective one of, the first and second ports. In embodiments, the valve means comprises a first state or position in which the high pressure inlet is connected to the first port and the low pressure return outlet to the second port. In embodiments, the valve means comprises a second state or position in which the high pressure inlet is connected to the second port and the low pressure return outlet to the first port. In embodiments, the valve means comprises a third state or position in which each of the high pressure inlet, the low pressure return outlet and the first and second ports are isolated.

In embodiments, at least one or each valve means comprises a supply/return port, e.g. a single supply/return port. The valve means may be operable to selectively connect either the high pressure inlet or the low pressure return outlet to the supply/return port of the or each valve means.

In other embodiments, at least one or each valve means comprises a high pressure inlet and a supply port, e.g. a single supply port. In such embodiments, the system or actuator or valve means may be operable or configured to discharge fluid from the actuator to a discharge reservoir.

The system or circuit may comprise a bleed assembly, which may be fluidly connected between the valve means and the inlet of the pump. The bleed assembly may comprise an inlet port, e.g. for fluidly connecting the inlet of the pump to a source of fluid. The bleed assembly may comprise an outlet port, e.g. for fluidly connecting to the valve means to a discharge reservoir. The bleed assembly may comprise a shutoff means, which may be between the inlet port and the outlet port, for selectively opening and closing fluid communication between the inlet port and the outlet port and/or between the valve means and the inlet of the pump.

Another aspect of the invention provides a fluidic control system, e.g. for a vehicle, the system comprising a closed fluidic circuit including a pump having an inlet and an outlet, valve means fluidly connected to the inlet and outlet of the pump, an actuator fluidly connected to the valve means for selectively receiving pressurized fluid therefrom and a bleed assembly fluidly connected between the valve means and the inlet of the pump, wherein the bleed assembly comprises an inlet port for fluidly connecting the inlet of the pump to a source of fluid, an outlet port for fluidly connecting the valve means to a discharge reservoir and a shutoff means between the inlet port and the outlet port for selectively opening and closing fluid communication therebetween.

The provision of a bleed assembly as described enables the fluid in the fluidic system to be bled and/or replaced easily and effectively. The actuator may comprise a brake actuator or a non-brake actuator. The system may comprise a controller, which may be operatively connected to the valve means, e.g. wherein the controller is configured to operate, in use, the valve means for controlling the supply of pressurized fluid to the actuator.

The circuit may comprise a precharge accumulator, which may comprise or provide or form part of the bleed assembly. The precharge accumulator may be fluidly connected to the pump, e.g. the pump inlet, and/or to the valve means, e.g. for maintaining a predetermined fluid pressure to the pump. The precharge accumulator may be fluidly connected between the pump inlet and the low pressure outlet(s) of the valve means, e.g. for maintaining a predetermined fluid pressure to the pump.

The precharge accumulator may comprise a charging chamber, which may be fluidly connected to the fluidic circuit. The precharge chamber may comprise biasing means, which may act on the charging chamber, e.g. to generate a pressure therein and/or for maintaining the predetermined fluid pressure to the pump inlet. The precharge accumulator may comprise a movable member, e.g. for varying the volume of the charging chamber.

The charging chamber of the precharge accumulator may comprise a chamber inlet and/or a chamber outlet. The chamber inlet may be fluidly connected to the low pressure outlet(s) of the valve means. The chamber outlet may be fluidly connected to the pump inlet. The movable member may comprise a bleed position in which the it blocks the chamber inlet and outlet.

The fluidic circuit or precharge accumulator may comprise a bleed inlet port, which may comprise or provide the inlet port of the bleed assembly and/or a bleed outlet port, which may comprise or provide the outlet port of the bleed assembly. The bleed inlet port may be fluidly connected to the chamber outlet of the charging chamber. The bleed inlet port may be for fluid connection with a source of fluid. The bleed outlet port may be fluidly connected to the chamber inlet. The bleed outlet port may be for fluid connection with a discharge reservoir. The system may be operable to move the movable member to the bleed position, for example to enable the fluidic circuit to be bled.

The system or fluidic circuit may comprise a sensor for determining the position of the movable member.

The system may comprise one or more accumulators, for example pressure accumulators. At least one or each accumulator may be fluidly connected to the pump and/or at least one of the valve means, for storing pressurized fluid. The one or more accumulators may be fluidly connected between the pump and at least one of the valve means. Each valve means may comprise a respective one or more accumulators, for example fluidly coupled to the or an inlet thereof. At least one of the accumulators may comprise an accumulator valve means, e.g. a valve such as a one-way valve, for selectively controlling the flow of fluid from the pump to the accumulator or from the accumulator to the actuator valve means.

Any of the valve means described herein may comprise a valve assembly. The valve means or valve assembly may comprise one or more valves, for example a control valve or two or more control valves, which may be operatively or fluidly connected. The fluidic circuit may comprise a pneumatic or hydraulic circuit. Preferably, the fluidic circuit comprises a hydraulic circuit. The fluidic circuit comprising the master cylinder, e.g. the further fluidic circuit, may comprise a pneumatic or hydraulic circuit.

The system or controller may be configured to control or operate the vehicle, e.g. one or more functions thereof, at least partially independent of driver input and/or autonomously or semi-autonomously. The system or controller may be configured to operate one or more, for example each, valve means at least partially independent of driver input and/or autonomously or semi-autonomously. The system or controller may be configured to be included or incorporated into, or comprise or form part of, an autonomous or semi-autonomous vehicle control system. In a particularly preferred embodiment, the system or controller is configured to control or operate the vehicle, e.g. one or more functions thereof, autonomously and/or completely independent of driver input. The system may be free of any manual actuators, such as pedals, levers and the like, for providing driver input.

Another aspect of the invention provides a kit of parts or retrofit kit for assembly into a fluidic control system as described above. The kit may comprise any one or more features or components of the aforementioned system.

Another aspect of the invention provides a method of bleeding a closed fluidic circuit, the method comprising connecting an external source of fluid to an inlet of a pump of the closed fluidic circuit via an inlet port, connecting a discharge reservoir to an outlet port upstream of the inlet port and operating a shutoff means between the inlet port and the outlet port to block fluid flow through the circuit between the inlet port and the outlet port.

The method may comprise operating the pump to draw fluid from the external source of fluid, e.g. through the circuit, and/or out of the outlet port and/or into the discharge reservoir. In embodiments, a pressurized external source of fluid is connected to the inlet of the pump, for example to induce a flow of fluid through the circuit and/or out of the outlet port and/or into the discharge reservoir. The external source of fluid may be pressurized and the pump may be operated to draw fluid from or supplement fluid flow or pressure from the pressurized external source of fluid. The method may comprise operating the shutoff means to open fluid flow through the circuit between the inlet port and the outlet port. The method may further comprise disconnecting the source of fluid from the inlet port and/or closing the inlet port. The method may further comprise disconnecting the discharge reservoir from the outlet port and/or closing the outlet port.

Another aspect of the invention provides an autonomous or semi-autonomous vehicle control system comprising a fluidic control system or kit of parts or retrofit kit as described above.

Another aspect of the invention provides a computer program element comprising computer readable program code means for causing a processor to execute a procedure to control the pump and/or valve means of a system as described above.

A further aspect of the invention provides the computer program element embodied on a computer readable medium.

A yet further aspect of the invention provides a computer readable medium having a program stored thereon, where the program is arranged to make a computer execute a procedure to implement one or more steps to control the pump and/or valve means of a system as described above.

A yet further aspect of the invention provides a control means or control system or controller comprising the aforementioned computer program element or computer readable medium.

Another aspect of the invention provides a controller for use in a control system as described above, the controller comprising a computer readable medium having a program stored thereon, where the program is arranged to make a computer execute a procedure to implement one or more steps to control the pump and/or valve means of the system.

Another aspect of the invention provides a vehicle comprising a control system or a controller or kit of parts or retrofit kit as described above.

The invention may be comprised or incorporated into any type of vehicle. Such vehicle may comprise, for example, a land based, marine based or air based vehicle or any combination thereof. For the avoidance of doubt, the vehicle may comprise an automobile, whether it be a passenger vehicle, motorcycle, small, medium or large automobile, van, bus or lorry, or a boat, ship, hovercraft, single or multi-engine propeller driven or jet aircraft or any other vehicle.

Although the embodiments described relate to vehicles, aspects of the invention may be incorporated into other systems, for example but without limitation, such systems may relate to exploration, oil field development or any other application relating to land, subsea, offshore, space or otherwise.

For the avoidance of doubt, any of the features described herein apply equally to any aspect of the invention.

Reference herein to the system or controller being configured to control or operate one or more features may comprise being programmed to carry out such control or operation.

For purposes of this disclosure, and notwithstanding the above, it is to be understood that any controller(s), control units and/or control modules described herein may each comprise a control unit or computational device having one or more electronic processors. The controller may comprise a single control unit or electronic controller or alternatively different functions of the control of the system or apparatus may be embodied in, or hosted in, different control units or controllers or control modules. As used herein, the terms "control unit" and "controller" will be understood to include both a single control unit or controller and a plurality of control units or controllers collectively operating to provide the required control functionality. A set of instructions could be provided which, when executed, cause said controller(s) or control unit(s) or control module(s) to implement the control techniques described herein (including the method (s) described herein). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described herein may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

THE DRAWINGS

Embodiments of the invention will now be described by way of example only with reference to the accompanying drawings in which.

DETAILED DESCRIPTION

Figure 1:
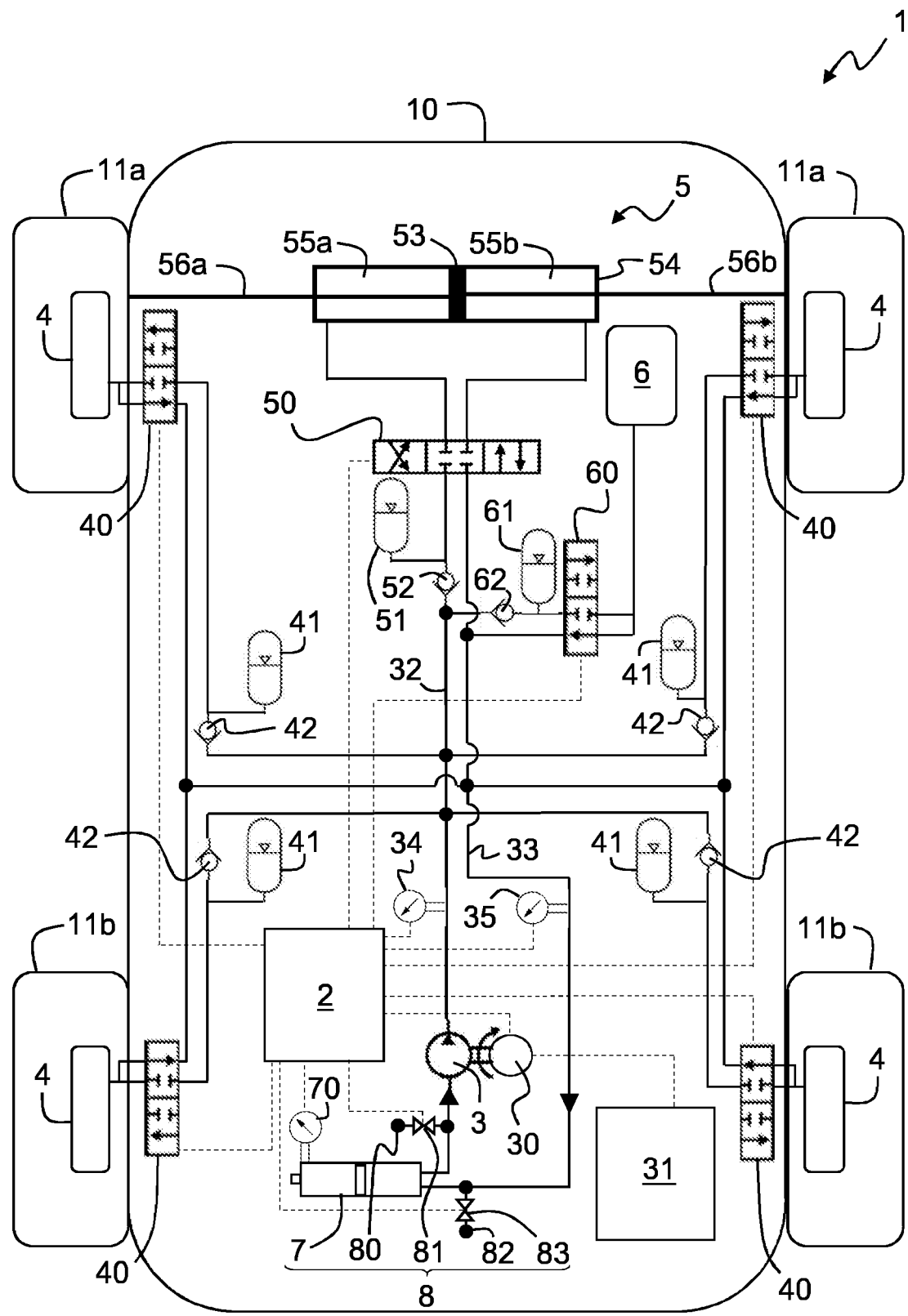
FIG. 1 is a schematic representation of a fluidic control system according to an embodiment of the invention.

Referring now to FIG. 1, there is shown a fluidic control system 1 incorporated into a vehicle 10 having front wheels 11a and rear wheels 11b. The system 1 uses a hydraulic operating fluid in this embodiment, but in certain circumstances that would be appreciated by the skilled person the preferred operating fluid may comprise a gas, such as air, or some other fluid. The vehicle 10 also includes a controller 2, which may be dedicated for controlling the hydraulic control system 1 or may form part of the onboard computer system of the vehicle 10. Whilst illustrated schematically as a single controller 2, it will be appreciated that the function carried out by the controller 2 may be implemented through one or more control units and/or one or more control modules incorporated within one or more such control units and the term "controller" is to be construed accordingly.

The hydraulic circuit 1 includes a fixed displacement pump 3 mechanically coupled to a variable speed, brushless electric motor 30. The motor 30 is electrically connected to an energy storage device 31, a battery 31 in this embodiment, and is operatively connected to the controller 2. In this embodiment, the motor 30 and the battery 31 are both independent of the powertrain of the vehicle 10, although in embodiments it may be advantageous for the motor 30 to be connected to the same energy storage device as a powertrain of the vehicle 10. As such, the motor 30 and pump 3 are dedicated to pressurizing the fluidic control circuit 1 and are therefore sized and configured to be no larger, heavier or more complex than required for this purpose. This arrangement enables the weight of the system 1 to be minimized and the efficiency of the system 1 to be maximized. It will be appreciated that the battery 31 may comprise a lithium-ion, solid-state, lead-acid, nickel metal hydride or molten chloroaluminate sodium battery. Alternatively, the energy storage device 31 may comprise a fuel cell or any other appropriate energy storage device 31.

The hydraulic circuit 1 also includes a first set of actuators 4 each fluidly connected to a respect first valve means 40, a second actuator 5 fluidly connected to a second valve means 50 and a third actuator 6 fluidly connected to a third valve means 60. Each of the valve means 40, 50, 60 is operatively connected to the controller 2. It will be appreciated by the skilled person that the valve means 40, 50, 60 illustrated schematically herein are non-limiting and may be implemented by any number of other valve arrangements. Such valve arrangements may, but need not, include a plurality of individual valves or any other arrangement or mechanism that controls the supply of pressurized fluid to the relevant actuator 4, 5, 6.

In this embodiment, the hydraulic circuit 1 is closed. More particularly, each of the valve means 40, 50, 60 includes a respective high pressure inlet fluidly connected to an outlet of the pump 3 via a respective pressure accumulator 41, 51, 61 and a low pressure outlet fluidly connected to the inlet of the pump 3 via a precharge accumulator 7. Thus, the circuit is divided into a high pressure supply line 32 and a low pressure return line 33. Each pressure accumulator 41, 51, 61 includes a check valve 42, 52, 62 upstream thereof to prevent backflow to the pump 3. Each of the high pressure line 32 and the low pressure line 33 includes a respective pressure sensor 34, 35 for determining a pressure of the hydraulic fluid therein. The pressure sensors 34, 35 are operatively connected to the controller 2. The precharge accumulator 7 also includes a pressure sensor 70 operatively connected to the controller 2.

The controller 2 determines the pressure in the high pressure line 32 using the pressure sensor 34 and controls the speed of the motor 30 to operate the pump 3 in order to maintain the pressure within a predetermined range, thereby to provide closed loop feedback control of the pressure within the system 1.

In this embodiment, the first set of actuators 4 are brake calipers and each of the first valve means 40 is a 4/2 brake control valve 40, in which both of the actuator-side ports supply an inlet of the caliper 4. Each brake control valve 40 includes a first state, in which the high pressure line 32 is fluidly connected to the caliper 4, and a second state, in which the low pressure line 33 is fluidly connected to the caliper 4. The controller 2 is configured to move each brake control valve 40 between its first and second states.

As such, when the controller 2 places the brake control valve 40 in the first state, the caliper 4 applies a braking force to each wheel 11a, 11b by actuating brake pads (not shown) to apply a friction force to brake discs (not shown) in the normal way. When the controller 2 places the brake control valve 40 in the second state, the pressure within the caliper 4 actuation system is relieved. Other arrangements are also envisaged and may be advantageous, for example the valve means 40 may comprise a valve operable to provide a variable pressure of hydraulic fluid to the caliper 4. Moreover, the caliper 4 may be replaced by a drum brake cylinder for actuating a brake shoe to engage a brake drum or any other suitable actuation means.

In this embodiment, the second actuator 5 is a steering actuator and the second valve means 50 is a 4/3 steering control valve 50. The steering actuator 5 includes a piston 53 movable within a cylinder 54, thereby to describe first and second variable volumes 55a, 55b, and a steering arm 56a, 56b mechanically connecting each side of the piston 53 to the front side of one of the front wheels 11a of the vehicle 10. A first of the actuator-side ports of the steering control valve 50 is fluidly connected to the first variable volume 55a and a second of the actuator-side ports of the steering control valve 50 is fluidly connected to the second variable volume 55b. The steering control valve 50 includes first, second and third states and the controller 2 is configured to move the steering control valve 50 between its states.

When the controller 2 places the steering control valve 50 in its first state, the high pressure line 32, the low pressure line 33 and the actuator-side ports are all isolated, the piston 53 is kept stationary and the direction of the front wheels 11a is maintained. When the controller 2 places the steering control valve 50 in its second state, the high pressure line 32 is fluidly connected to the first variable volume 55a and the low pressure line 33 is fluidly connected to the second variable volume 55b, thereby causing the piston 53 to move to the right and the front wheels 11a to pivot clockwise causing the vehicle change direction toward the right. When the controller 2 places the steering control valve 50 in its third state, the high pressure line 32 is fluidly connected to the second variable volume 55b and the low pressure line 33 is fluidly connected to the first variable volume 55a, thereby causing the piston to move to the left and the front wheels 11a to pivot counter-clockwise causing the vehicle change direction toward the left. Other arrangements are also envisaged and may be advantageous, as will be appreciated by the skilled person. It will be appreciated that the system 1 may incorporate closed loop steering feedback, for example in which one or more sensors are provided for determining one or more of the position of the piston 53 of the steering actuator 5, the pressure in each of the variable volumes 55a, 55b, the position of the front wheels 11a, movement sensors, e.g. accelerometers or GPS receivers, for determining a direction of movement of the vehicle and/or any other feature of the steering system.

In this embodiment, the third brake actuator 6 is a clutch assembly actuator and the third valve means 60 is a 4/2 clutch control valve 60, in which both of the actuator-side ports supply an inlet of the clutch actuator 6. The clutch control valve 60 includes a first state, in which the high pressure line 32 is fluidly connected to the clutch actuator 6, and a second state, in which the low pressure line 33 is fluidly connected to the clutch actuator 6. The controller 2 is configured to move the clutch control valve 60 between its first and second states.

As such, when the controller 2 places the clutch control valve 60 in the first state, the clutch actuator 6 causes the clutch (not shown) to disengage the gearbox (not shown) from the engine (not shown) to enable the gear ratio to be changed in the normal way. When the controller 2 places the clutch control valve 60 in the second state, the pressure within the clutch actuator 6 is relieved. Other arrangements are also envisaged and may be advantageous, for example the valve means 60 may comprise a valve operable to provide a variable pressure of hydraulic fluid to the clutch actuator 6. It will be appreciated that the system 1 may incorporate closed loop clutch feedback, for example in which one or more sensors are provided for determining the position or condition of the clutch actuator 6.

In this embodiment, the precharge accumulator 7 includes a variable volume charging chamber 71 fluidly connected to the low pressure line 33 of the circuit 1 and biasing means 72 acting on the charging chamber 71 to generate a pressure therein for maintaining a predetermined fluid pressure to the inlet of the pump 3. The precharge accumulator 7 includes a movable member in the form of a piston 73, which is movable within a cylinder 74 and describes with the cylinder 74 the charging chamber 71. The biasing means 72 is in the form of a pressurized secondary fluid, air in this embodiment, which is contained within a precharge chamber 75 on the other side of the piston 73 to the charging chamber 71 and acts on the piston 73 to apply a force to the charging chamber 71. The precharge accumulator 7 includes an air inlet 76 for charging or discharging the precharge chamber 75. It will be appreciated that the piston 73 may be replaced by any other suitable movable member, such as a bladder member, and/or the biasing means may be provided by any other suitable means, such as a spring.

The pressure sensor 70 is configured to determine the air pressure within the precharge chamber 75. As such, with the precharge chamber 75 charged to a predetermined pressure, the controller 2 is able to monitor the air pressure based on readings from the pressure sensor 70 during operation of the system 1. This feedback enables the controller 2 monitor the state of the circuit 1. In this embodiment, the controller 2 incorporates a diagnostic module, which analyses pressure readings from all of the pressure sensors 34, 35, 70 on a regular basis. The pressure within the precharge chamber 75 is indicative of the position of the piston 73. As such, this reading may be used to estimate the quantity of hydraulic fluid within the circuit 1. A sustained reduction, or gradual decrease, in pressure within the precharge chamber 75 could therefore indicate a reduction of hydraulic fluid within the circuit 1. The controller 2 is configured to generate an alert or warning if the estimated volume deviates from a predetermined value or range.

As an alternative to, or in addition to, the pressure sensor 70, the precharge accumulator 7 may include a position sensor for detecting directly the position of the piston 73. The pressure sensor 70 and/or position sensor may also be used to estimate the pressure within the low pressure line 33, for example instead of or in addition to the pressure sensor 35.

In this embodiment, the precharge accumulator 7 also forms part of a bleed assembly 8, which includes a bleed inlet port 80, a bleed inlet valve 81, a bleed outlet port 82 and a bleed outlet valve 83. The bleed inlet valve 81 and the bleed outlet valve 83 are both operatively connected to the controller 2 in this embodiment. In other embodiments, these valves 81, 83 are operated manually. The bleed inlet port 80 is fluidly connected to the low pressure line 33 immediately downstream of the charging chamber 71 of the precharge accumulator 7, specifically between the charging chamber 71 and the inlet of the pump 3. The bleed inlet valve 81 selectively opens and closes fluid communication between the low pressure line 33 and the bleed inlet port 80. The bleed outlet port 82 is fluidly connected to the low pressure line 33 immediately upstream of the charging chamber 71 of the precharge accumulator 7 and the bleed outlet valve 83 selectively opens and closes fluid communication between the low pressure line and the bleed outlet port 82.

Figure 2:
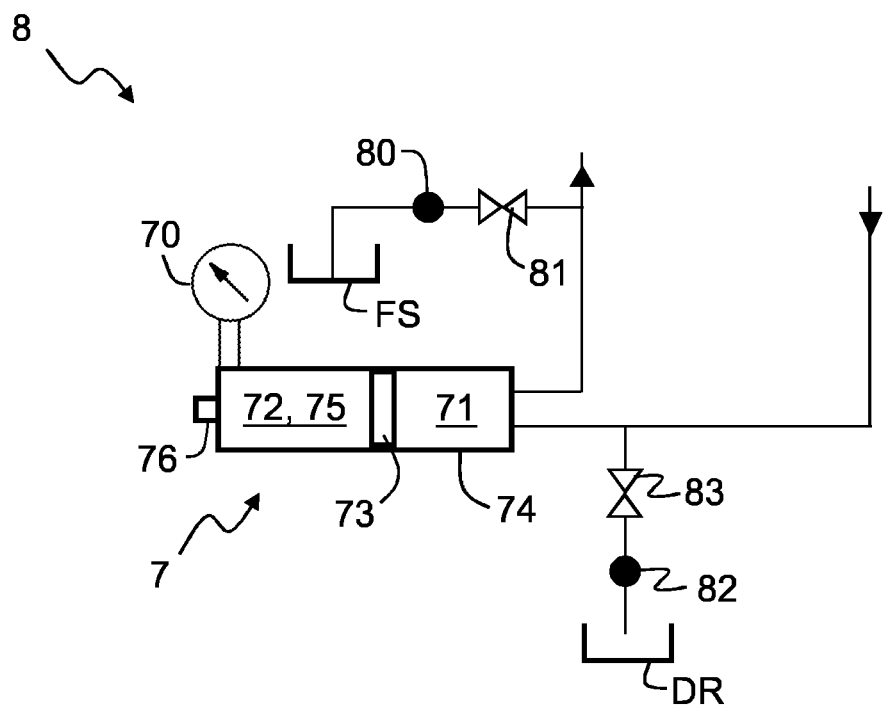
FIG. 2 is a schematic representation of the bleed assembly of the system of FIG. 1.
Figure 3:
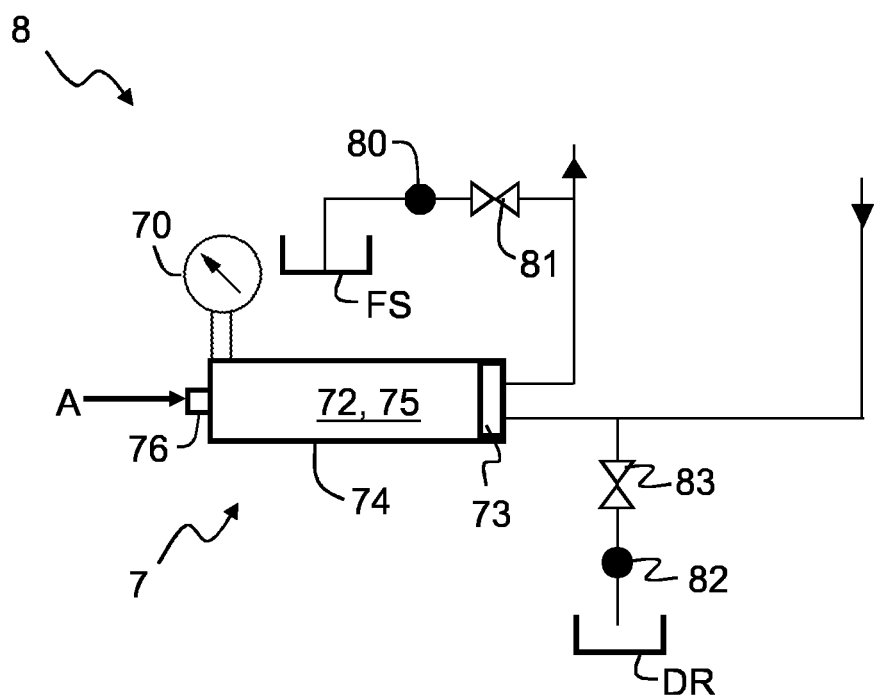
FIG. 3 is a schematic representation of the bleed assembly shown in FIG. 2 with the piston of the precharge accumulator shown in a bleed position.

As shown in FIGS. 2 and 3, the bleed assembly 8 may be operated to bleed the hydraulic system 1 and/or to replace the hydraulic fluid therein. This is achieved by first deactivating the pump 3, placing each of the brake control valves 40 and clutch control valve 60 to their second state, placing the steering control valve 50 in its first state, connecting a discharge reservoir DR to the outlet port 82 and opening the bleed outlet valve 83 to depressurize the low pressure line 33. This reduction in pressure causes the piston 73 to move toward the ports coupled to the low pressure line 33 (to the right in FIGS. 1-3) such that the piston 73 closes off the low pressure line 33, as shown more clearly in FIG. 3. If appropriate, air A may be introduced into the air inlet 76 of the precharge accumulator 7 to cause the piston 73 to seal off the ports.

The bleed inlet port 80 is then connected an external source of fluid FS, the bleed inlet valve 81 is opened, the pump 3 is activated to draw fluid from the fluid source FS and the control valves 40, 50, 60 are operated to create fluid flow through the circuit 1 to bleed the hydraulic system 1 and/or to replace the hydraulic fluid therein. The bleed outlet valve 83 may then be closed whilst the system 1 continues to be operated in order to re-pressurize the low pressure line 33. Additionally or alternatively, at least some of the air 72 in the precharge chamber 75 of the precharge accumulator 7 may be evacuated to allow the charging chamber 71 to refill with hydraulic fluid and, if appropriate, air A may be re-introduced thereafter to bring the precharge chamber 75 back to the predetermined pressure for normal operation. It will be appreciated that several variations to this method are envisaged and may be preferable. Moreover, a separate shutoff means, e.g. a valve, may be provided instead of using the precharge accumulator 7 to close off the low pressure line 33.

The skilled person will appreciate from the aforementioned disclosure that the system 1 of the present invention enables the use of a common fluidic circuit for the operation of both the brakes and one or more other actuation systems, which makes use of the advantages of fluidic control systems whilst benefiting from the efficiencies derived from the aforementioned integration of multiple control systems. The present invention also provides a simple, inexpensive and efficient means of generating pressure within the system on demand and independent of, for example, the operation of the powertrain of the vehicle. The actuator may comprise a brake actuator or a non-brake actuator. The present invention further enables the fluid in the fluidic system to be bled and/or replaced easily and effectively and is able to estimate the quantity of fluid within the circuit and/or detect an abnormal pressure variation within the circuit. Several other advantages will be apparent to the skilled person.

Figure 4:
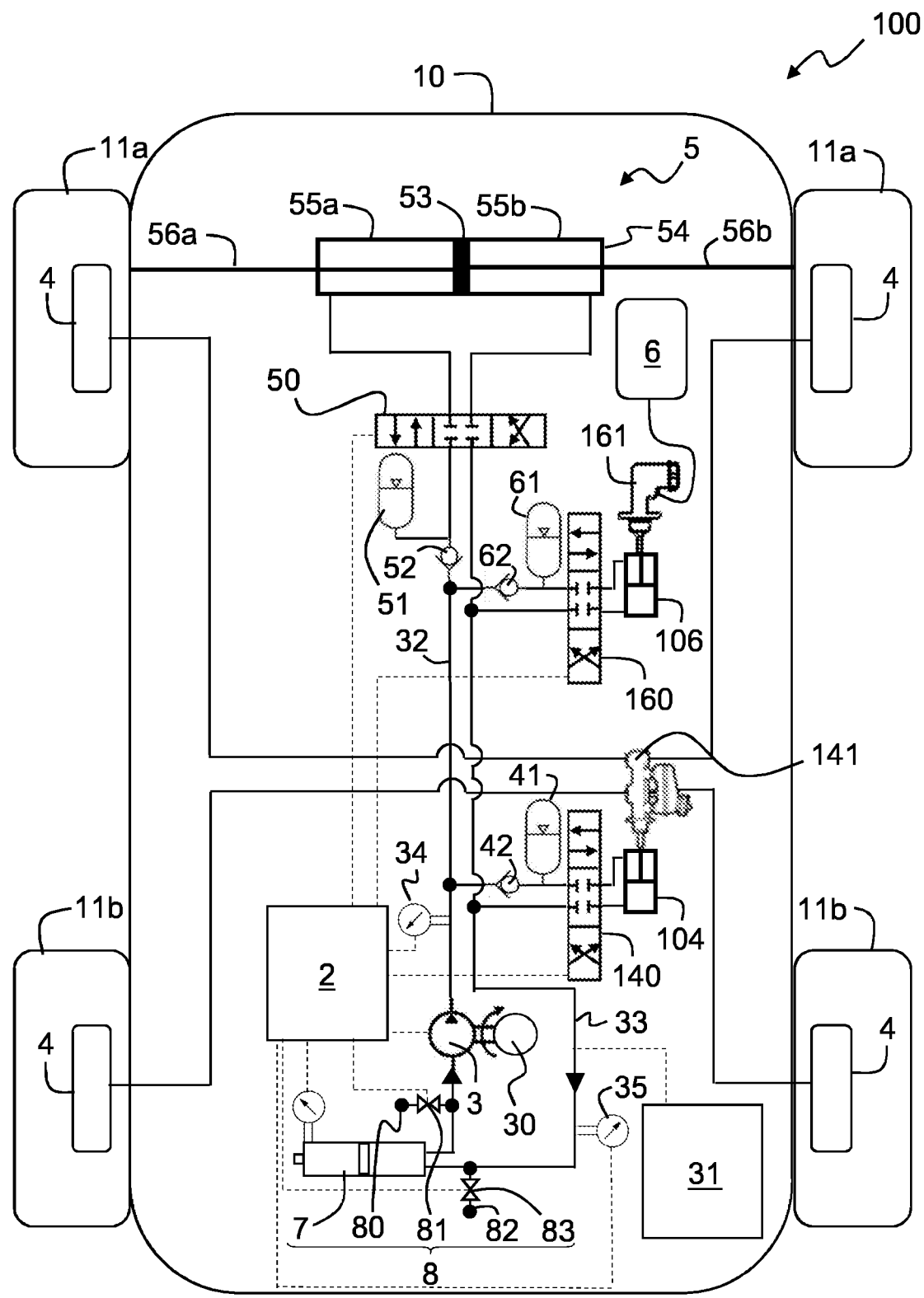
FIG. 4 is a schematic representation of a fluidic control system according to another embodiment of the invention.

Referring now to FIG. 4, there is shown a hydraulic control system 100 similar to the system 1 of FIGS. 1 to 3, wherein like references depict like features that will not be described herein. The hydraulic control system 100 according to this embodiment differs from that of the previous embodiment in that each of the brake actuators 4 and clutch actuator 6 is operated via a secondary fluidic circuit.

The hydraulic control system 100 includes a brake master cylinder actuator 104 and a clutch master cylinder actuator 106 each fluidly connected to the high and low pressure lines 32, 33 via a respective control valve 140, 160. Each master cylinder actuator 104, 106 is mechanically connected to or integral with a respective master cylinder 141, 161 that selectively pressurizes the secondary fluidic circuit. Each control valve 140, 160 is operatively connected to the controller 2 and is a 4/3 control valve similar to the steering control valve 50. Each master cylinder actuator 104, 106 includes a piston movable within a cylinder to describe first and second variable volumes, similar to the steering actuator 5. The piston of each master cylinder actuator 104, 106 is connected to the master cylinder 141, 161 such that movement of the piston causes the master cylinder 141, 161 to selectively pressurize or depressurize the secondary fluidic circuit.

More particularly, a first of the actuator-side ports of each of the control valves 140, 160 is fluidly connected to the first variable volume of the master cylinder actuator 104 and a second of the actuator-side ports thereof is fluidly connected to the second variable volume. Each control valve 140, 160 includes a first state in which the high pressure line 32, the low pressure line 33 and the actuator-side ports are all isolated. Each control valve 140, 160 also includes a second state in which the high pressure line 32 is fluidly connected to one side of the piston of the master cylinder actuator 104 to cause the master cylinder 141, 161 to pressurize the secondary fluidic circuit. Each control valve 140, 160 also includes a third state, in which the low pressure line 33 is fluidly connected to the other side of the piston to cause the master cylinder 141, 161 to depressurize the secondary fluidic circuit.

Thus, the invention also enables conventional brake circuits and clutch circuits to be operated by the fluidic circuit 100. As such, the versatility of the present invention is such that existing vehicles may be retrofitted with a fluidic control circuit 100 according to the invention. The present invention also facilitates the integration of autonomous or semi-autonomous functionality in existing vehicle systems.

Indeed, it is envisaged that the fluidic system 1, 100 of the invention may be particularly useful in an autonomous or semi-autonomous vehicle 10. The system 1, 100 or controller 2 may be configured to control or operate the vehicle 10, e.g. one or more functions thereof, at least partially independent of driver input, for example autonomously or semi-autonomously. The system 1, 100 or controller 2 may be configured to operate one or more, for example each, valve means 40, 50, 60, 140, 160 at least partially independent of driver input. The system 1, 100 or controller may be incorporated into an autonomous or semi-autonomous vehicle control system.

It will be appreciated by those skilled in the art that several variations to the aforementioned embodiments are envisaged without departing from the scope of the invention. For example, the fluidic circuit 1, 100 and/or the secondary fluidic brake and/or clutch circuits of the fluidic circuit 100 of FIG. 4 may comprise a gas or pneumatic operating fluid. In addition, the system 1, 100 may comprise one or more additional valve means and/or one or more additional actuators, e.g. non-brake actuators. The controller 2 may be configured to operate, in use, the or each additional valve means, e.g. for controlling the supply of pressurized fluid to the or each additional actuator. The additional actuators may include any one or more of a gear shift actuator for changing a gear ratio of the vehicle, a torque vectoring actuator for varying the torque to one or more wheels of the vehicle, a suspension actuator for changing a suspension characteristic of the vehicle, an aerodynamic or aerofoil actuator for moving an aerodynamic element of the vehicle and an auxiliary actuator.

It will also be appreciated by those skilled in the art that any number of combinations of the aforementioned features and/or those shown in the appended drawings provide clear advantages over the prior art and are therefore within the scope of the invention described herein.

The invention claimed is:

1. A fluidic control system comprising a controller and a closed fluidic circuit, the fluidic circuit comprising a pump having an inlet and an outlet, a valve assembly operatively connected to the controller and fluidly connected to the inlet and outlet of the pump, an actuator fluidly connected to the valve assembly for selectively receiving pressurised fluid therefrom and a bleed assembly fluidly connected between the valve assembly and the inlet of the pump, wherein the bleed assembly comprises an inlet port for fluidly connecting the inlet of the pump to a source of fluid, an outlet port for fluidly connecting the valve assembly to a discharge reservoir and a shutoff mechanism between the inlet port and the outlet port for selectively opening and closing fluid communication therebetween.

2. System according to claim 1 comprising a precharge accumulator, wherein the valve assembly comprises a high pressure inlet fluidly connected to an outlet of the pump and a low pressure outlet fluidly connected to an inlet of the pump such that the fluidic circuit is closed, the precharge accumulator being fluidly connected between the pump inlet and the low pressure outlet of the valve mechanism for maintaining a predetermined fluid pressure to the pump inlet.

3. System according to claim 2, wherein the precharge accumulator comprises a charging chamber fluidly connected to the fluidic circuit and a movable member for varying the volume of the charging chamber, the charging chamber of the precharge accumulator comprising a chamber inlet fluidly connected to the low pressure outlet of the valve mechanism and a chamber outlet fluidly connected to the pump inlet, the shutoff mechanism being provided at least in part by the movable member which comprises a bleed position in which it blocks the chamber inlet and the chamber outlet.

4. System according to claim 3, wherein the precharge accumulator comprises a sensor for determining the position of the movable member and the controller is configured to detect automatically, from a position of the movable member determined using the sensor, faults and/or leaks within the fluidic circuit by estimating the quantity of fluid within the fluidic circuit and/or by detecting an abnormal pressure variation within the fluidic circuit.

5. System according to claim 3, wherein the system is operable to move the movable member to the bleed position to enable the fluidic circuit to be bled.

6. System according to claim 2, wherein the precharge accumulator comprises a biaser acting on the movable member to generate a pressure in the charging chamber for maintaining the predetermined fluid pressure to the pump inlet.

7. System according to claim 6, wherein the biaser comprises a precharge chamber containing a second pressurised fluid therein.

8. System according to claim 7 comprising a pressure sensor for sensing the pressure within the precharge chamber for determining the position of the movable member and/or for estimating the pressure at the inlet of the pump.

9. System according to claim 6, wherein the biaser comprises a biasing mechanism or spring.

10. System according to claim 1, wherein the actuator comprises a first actuator and the valve assembly comprises a first valve assembly, the fluidic circuit comprising a second actuator fluidly connected to a second valve assembly operatively connected to the controller, the controller being configured to operate, in use, each valve assembly for controlling the supply of pressurised fluid to each actuator for the operation thereof.

11. System according to claim 10 comprising a third valve assembly and a third actuator fluid connected thereto, wherein the third valve assembly is operatively connected to the controller and the controller is configured to operate, in use, the third valve assembly for controlling the supply of pressurised fluid to the third actuator.

12. System according to claim 10, wherein the first actuator comprises a brake actuator for slowing or stopping a vehicle and the second actuator comprises a non-brake actuator.

13. System according to claim 1, wherein the actuator is one of a plurality of vehicle brake actuators, each brake actuator being fluidly connected to a respective first valve assembly, the controller being configured to operate each first valve assembly to control, in use, the supply of pressurised fluid to each brake actuator.

14. System according to claim 1, wherein the actuator comprises connector for mechanical connection to a master cylinder of a fluidic circuit of a vehicle and the controller is configured to operate the valve assembly in order to apply, in use, a mechanical force to the master cylinder.

15. System according to claim 1 comprising an electric motor coupled to the pump and operatively connected to the controller and the controller is configured to operate, in use, the motor to pressurise fluid in the fluidic circuit.

16. System according to claim 15, wherein the pump comprises a fixed displacement pump and the fluidic circuit comprises a pressure sensor downstream of the pump and operatively connected to the controller, the controller being configured to control, in use, the speed of the motor based on a pressure detected by the pressure sensor.

17. System according to claim 1 comprising one or more accumulators fluidly connected between the pump and the valve assembly for storing pressurised fluid.

18. System according to claim 1, wherein the controller is configured to operate a vehicle without driver input.

* * * * *